US012049169B2

(12) United States Patent
Sloterbeek

(10) Patent No.: US 12,049,169 B2
(45) Date of Patent: Jul. 30, 2024

(54) REARVIEW ASSEMBLY MOUNT

(71) Applicant: GENTEX CORPORATION, Zeeland, MI (US)

(72) Inventor: Eric S. Sloterbeek, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 13 days.

(21) Appl. No.: 17/883,897

(22) Filed: Aug. 9, 2022

(65) Prior Publication Data

US 2023/0057385 A1 Feb. 23, 2023

Related U.S. Application Data

(60) Provisional application No. 63/235,835, filed on Aug. 23, 2021.

(51) Int. Cl.
*B60R 1/04* (2006.01)
*F16M 11/14* (2006.01)

(52) U.S. Cl.
CPC .............. *B60R 1/04* (2013.01); *F16M 11/14* (2013.01); *F16M 2200/022* (2013.01)

(58) Field of Classification Search
CPC ... B60R 1/04; B60R 2011/0033; F16M 11/14; F16M 2200/022; F16M 11/2078; F16C 11/06; F16C 11/10
USPC ........................................................ 248/481
See application file for complete search history.

(56) References Cited

U.S. PATENT DOCUMENTS

| 3,367,616 | A | * | 2/1968 | Bausch | ..................... B60R 1/04 403/56 |
| 5,100,095 | A | * | 3/1992 | Haan | ........................ B60R 1/04 248/483 |
| 5,377,949 | A | * | 1/1995 | Haan | ..................... F16M 13/02 248/483 |
| 7,008,069 | B2 | * | 3/2006 | Ostreko | ................... B60R 1/12 359/872 |

(Continued)

FOREIGN PATENT DOCUMENTS

KR 1020140078945 A 6/2014

OTHER PUBLICATIONS

International Search Report dated Nov. 24, 2022, for corresponding PCT application No. PCT/US2022/039796, 3 pages.

(Continued)

*Primary Examiner* — Christopher Garft
(74) *Attorney, Agent, or Firm* — Price Heneveld LLP; Brian James Brewer

(57) ABSTRACT

This disclosure is directed to a mount assembly for a rearview assembly, which may comprise a member, a pivot, a cup, and/or a spring. The member may have a cavity with a tapered opening. The pivot may comprise a ball and be configured to support the rearview assembly. The cup may have an end portion, a wall portion, and a cavity. The cavity may be defined, at least in part, by the end and wall portions. Further, the cup may be disposed within the member and the ball portion may be disposed, at least in part, within the cavity of the cup. The spring may be disposed within the member and exert a force on the end portion of the cup. The force exerted onto the cup may be operable to jam the wall portion into the taper, causing the cup's wall portion to deflect and grip the ball portion.

14 Claims, 4 Drawing Sheets

(56) References Cited

U.S. PATENT DOCUMENTS

| | | | |
|---|---|---|---|
| 7,746,535 B2* | 6/2010 | Kelley | B60R 1/02 |
| | | | 359/267 |
| 7,784,953 B2* | 8/2010 | Rumsey | B60R 1/04 |
| | | | 359/872 |
| 2004/0195486 A1* | 10/2004 | Rumsey | B60R 1/04 |
| | | | 248/481 |
| 2007/0091626 A1 | 4/2007 | Hook | |
| 2009/0065671 A1* | 3/2009 | Burgstaller | E04F 13/0808 |
| | | | 248/288.11 |
| 2010/0033857 A1* | 2/2010 | Filipiak | B60R 1/04 |
| | | | 359/872 |
| 2010/0195230 A1* | 8/2010 | Hwang | B60R 1/04 |
| | | | 359/875 |
| 2016/0318447 A1* | 11/2016 | Pan | F16M 11/2078 |

OTHER PUBLICATIONS

Written Opinion dated Nov. 24, 2022, for corresponding PCT application No. PCT/ US2022/-39796, 5 pages.

* cited by examiner

REARVIEW ASSEMBLY MOUNT

CROSS-REFERENCE TO RELATED APPLICATIONS

This application claims priority under 35 U.S.C. § 119(e) to U.S. Provisional Application No. 63/235,835 filed on Aug. 23, 2021, entitled "Rearview Assembly Mount," the disclosure of which is hereby incorporated by reference in its entirety.

FIELD OF INVENTION

The present invention relates, in general, to mounts and, more particularly, to mounts for rearview assemblies.

BACKGROUND OF INVENTION

There is a demand for vehicles to have an increasing number of technological features. Accordingly, to enable such features, vehicles are being equipped with greater numbers of cameras and/or sensors. These cameras and/or sensors take up space. Further, it is often necessary or advantageous to position these cameras and/or sensors at the windshield, proximate the interior rearview assembly. However, the increased spatial demand at this location leaves less room for mounting structures of the rearview assembly. Additionally, the rearview assemblies themselves are incorporating an increasing number of features requiring supporting hardware, which may take up precious space inside the rearview assembly housing. This also leaves less room for interfacing with the mounting assembly to the extent that portions of the mount extend into the housing. Thus, there is a need for improved rearview mounting structures that take up less space proximate the windshield and/or within rearview assemblies.

SUMMARY

In accordance with the present disclosure, the problems associated with rearview assembly mounting structures have been substantially reduced or eliminated.

According to one aspect of the present disclosure, a mount assembly is disclosed. The mount assembly may comprise a tube, a base, a first cup, a pivot, a second cup, and a spring. The tube may be centrally aligned with an axis. Additionally, the tube may have a first end and a second end. Each of the first and second ends may be tapered. The base may be operable to be associated with a vehicle. Further, the base may have a knob centrally aligned with the axis. The first cup may be disposed within the first end of the tube. Additionally, the first cup may have an end portion, a wall portion extending from the end portion, and a cavity defined, at least in part, by the end and wall portions. In some embodiments, the end portion may comprise a surface extending substantially perpendicular to the axis. In some embodiments, the wall portion of the first cup may comprise a plurality of fingers. Further, the knob may be substantially disposed, at least in part, within the cavity. The pivot may comprise a ball portion and be operable to associate with and support the rearview assembly. The second cup may be disposed within the second end of the tube. Additionally, the second cup may have an end portion, a wall portion, and a cavity defined, at least in part, by the end and wall portions, wherein the ball is substantially disposed, at least in part, within the cavity of the second cup. In some embodiments, the wall portion of the second cup may extend along the ball portion beyond a widest part of the ball portion. In some embodiments, the wall portion of the second cup may comprise a plurality of fingers. The spring may be centrally aligned with the axis and disposed within the tube between the first and second cup. In some embodiments, the spring may be a coil spring. Further, the spring may be operable to exert a force to the end portions of the first and second cups. The force exerted onto the first cup may be operable to jam the wall portion into the taper of the first end of the tube, causing the wall portion of the first cup to deflect and grip the knob. Similarly, the force exerted onto the second cup may be operable to jam the wall portion of the second cup into the taper of the second end of the tube, causing the wall portion of the second cup to compress and grip the ball portion.

In some embodiments, the knob extends from a body of the base. Further, the knob may have a first end proximal relative the body and a second end relative the body. Additionally, the first end of the knob may be substantially tapered, at least in part. In some such embodiments, the second end of the knob may terminate in a substantially flat surface substantially perpendicular to the axis. Further, the substantially flat surface may have a profile substantially similar to a cross-sectional profile of the tube perpendicular to the axis along a common plane. In other such embodiments, the interface between the knob and the first cup may be operable to prevent the base from pivoting on the knob off central alignment with the axis.

In some embodiments, the pivot may further comprise a base portion. The base portion may be operable to pivot on the ball portion within the second cup such that the pivot may move out of central alignment with the axis.

In some embodiments, a cross-sectional profile of the tube in a plane perpendicular to the axis may correspond to a first polygon. Similarly, a cross-sectional profile of the first cup in the plane may also correspond to the first polygon. Conversely, a cross-sectional profile of the knob in the plane may correspond to at least one of a circle or a second polygon. The second polygon is different than the first polygon.

In other embodiments, a cross-sectional profile of the tube in a plane perpendicular to the axis may correspond to a first polygon. Similarly, a cross-sectional profile of the second cup in the plane may also correspond to the first polygon. Conversely, a cross-sectional profile of the ball portion in the plane may corresponds to a circle.

In some embodiments, a cross-sectional profile of each of the tube, the first cup, and the knob in a first plane perpendicular to the axis may each correspond to a circle. Additionally, a cross-sectional profile of each of the tube, the second cup, and the ball portion in a second plane perpendicular to the axis may also correspond to a circle.

In some embodiments, the pivot may further comprise a base portion. The base portion may be operable to be connected to a rearview assembly. Further, the pivot may be such that the ball portion is disposed substantially exterior relative a housing of the rearview assembly.

In accordance with another aspect of the present disclosure, a mount assembly is disclosed. The mount assembly may comprise a member, a pivot, a cup, and/or a spring. The member may have a cavity with a tapered opening at a first end thereof. The pivot may comprise a ball portion. Additionally, the pivot may be operable to associate with and support a rearview assembly. The cup may be disposed within the member. Further, the cup may have an end portion, a wall portion extending from the end portion, and a cavity. The cavity may be defined, at least in part, by the end and wall portions. In some embodiments, the wall portion may comprise a plurality of fingers. Additionally, the ball portion may be substantially disposed, at least in part, within the cavity of the second cup. Accordingly, the wall portion of the cup may extend along the ball portion beyond a widest part of the ball portion. The spring may be disposed within the member. Further, the spring may be operable to exert a force on the end portion of the cup. The force exerted onto the cup may be operable to jam the wall portion into the taper of the first end, causing the wall portion of the cup to deflect and grip the ball portion.

In some embodiments, the cavity and cup may be in central alignment with an axis running there through. Further, the pivot may further comprise a base portion. The base portion may be operable to pivot on the ball portion within the cup such that the pivot may move out of central alignment with the axis.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Figure 1A:
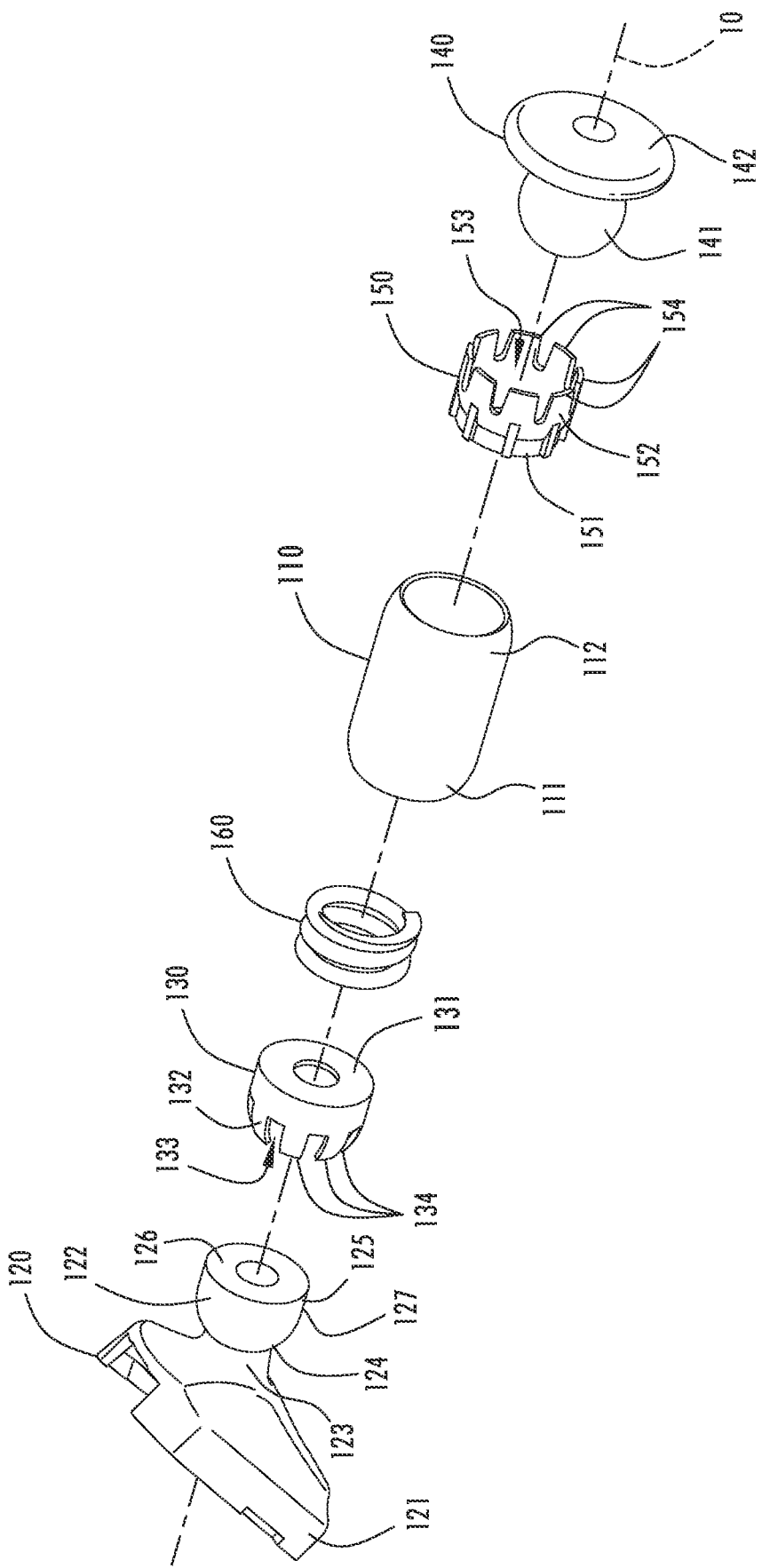
FIG. 1A: is an exploded first perspective view of an embodiment of a mount assembly.
Figure 1B:
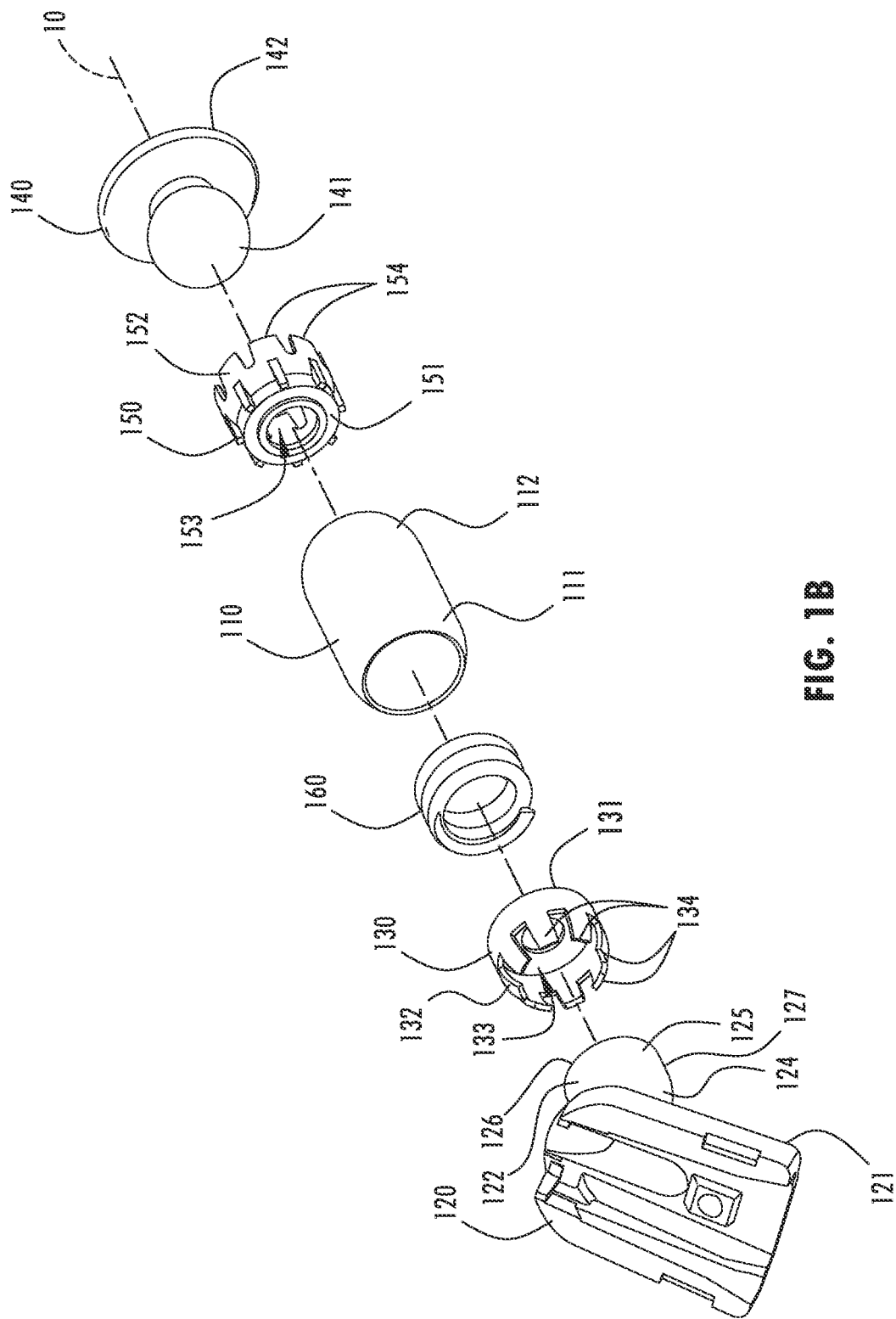
FIG. 1B: is an exploded second perspective view of an embodiment of a mount assembly.
Figure 1C:
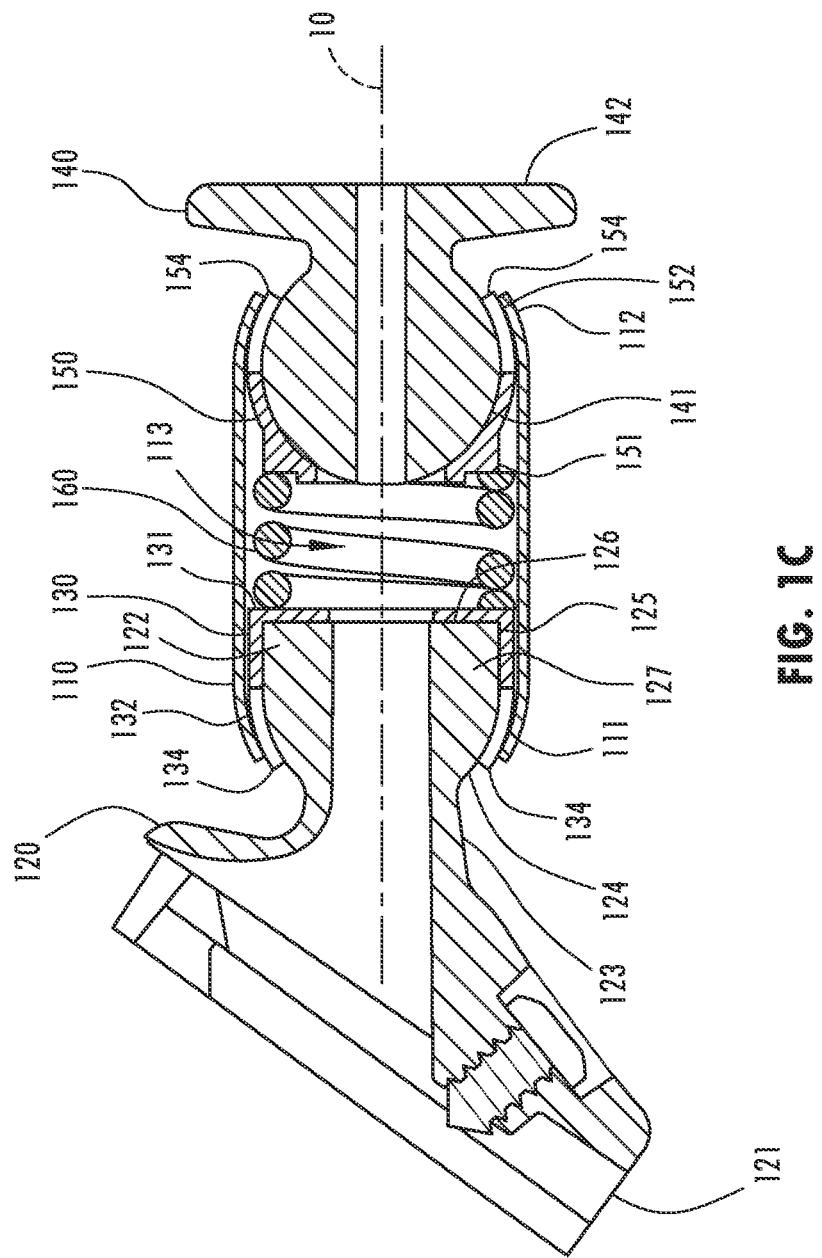
FIG. 1C: is a cross-sectional view of an embodiment of a mount assembly.
Figure 2:
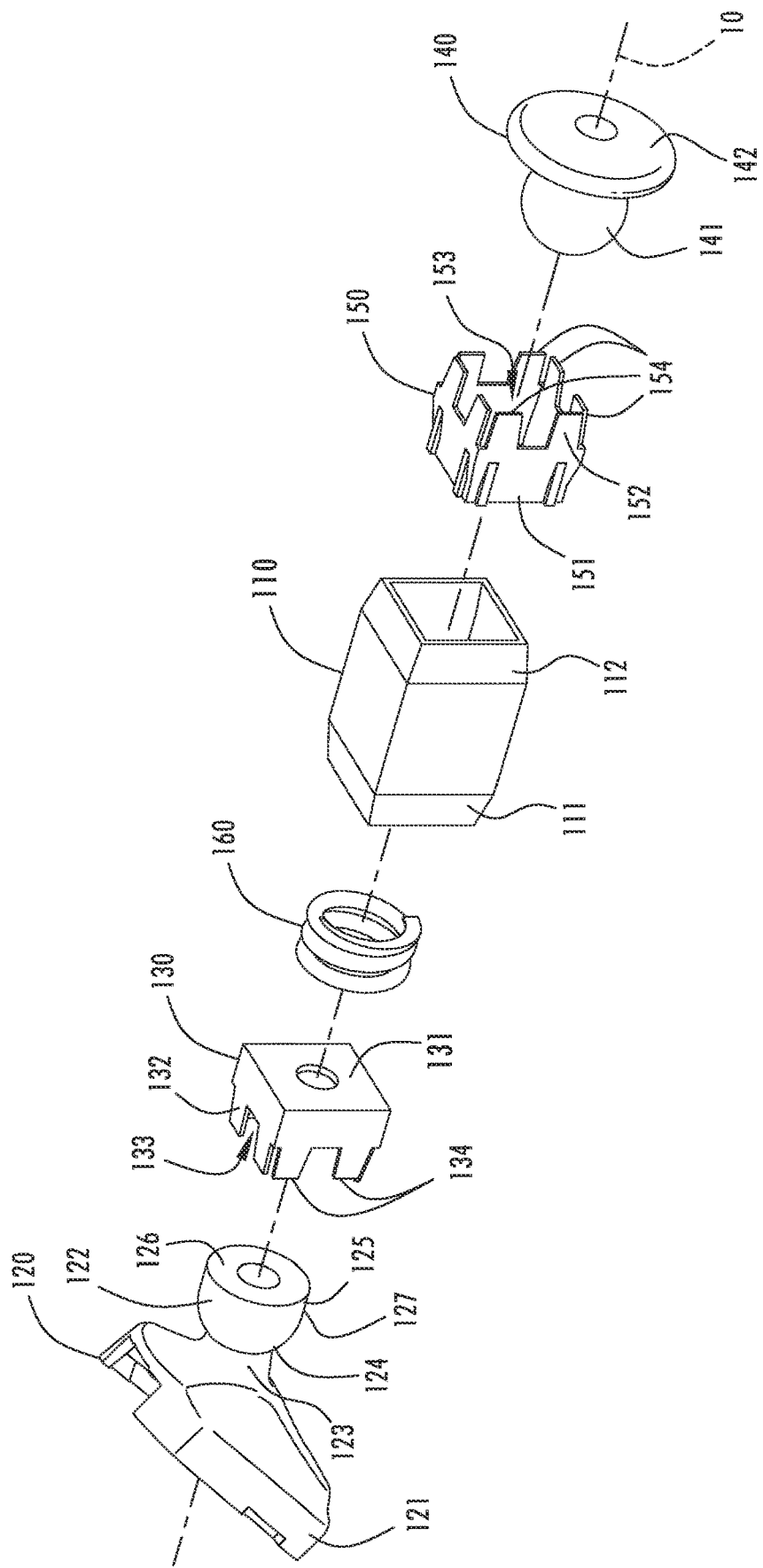
FIG. 2: is exploded first perspective view of an embodiment of a mount assembly.

The present disclosure is directed to a mount assembly 100. Accordingly, FIGS. 1A-2 illustrate embodiments of mount assembly 100. Mount assembly 100 may comprise a tube 110, a base 120, a first cup 130, a pivot 140, a second cup 150, and a spring 160. In some embodiments, mount assembly 100 may be disposed in a vehicle such that it may be operable to support an interior rearview assembly attached thereto.

Tube 110 may be an elongate object having a first end 111 and a second end 112 that substantially encloses a cavity and/or a channel 113 running therethrough and is open at the first and/or second ends 111, 112. Further, the first and second ends 111, 112 may each be tapered, at least in part. Additionally, an axis 10 may be defined that centrally passes through tube 110. Further, a cross-section of tube 110 perpendicular to axis 10 may have a profile substantially corresponding to a shape. In some embodiments, the shape may be substantially circular. In other embodiments, for example, the shape may be triangular, square, pentagonal, hexagonal, octagonal, or other suitable polygonal shape.

Base 120 may be a member that may be operably associated with the vehicle so as to substantially fix mount 100 thereto. Accordingly, base 120 may be operable to associate with a windshield or a windshield button of the vehicle. Additionally, base 120 may have a body 121 and a knob 122. Body 121 may comprise features necessary for interfacing with the vehicle. Knob 122 may extend from body 121 along and in central alignment with axis 10. In some embodiments, knob 122 may extend from body 121 via a neck 123 linking the two. Additionally, knob 122 may have a first end 124 and a second end 125. First end 124 may be a proximal end of knob 122 relative body 121. Conversely, second end 125 may be a distal end of knob 122 relative body 121. Further, first end 124 may be substantially tapered. Second end 125 may terminate at a surface 126. Surface 126 may substantially lie in a plane substantially perpendicular to axis 10. In some embodiments, surface 126 may be substantially flat. In some such embodiments, surface 126 may be substantially circular. In other such embodiments, embodiments, for example, surface 126 may be triangular, square, pentagonal, hexagonal, octagonal, or other suitable polygonal shape. Additionally, in some embodiments, surface 126 may have a shape substantially the same as the cross-sectional profile of tube 110 in a common plane. In some embodiments, knob 122 may further comprise a middle portion 127. Middle portion 127 may have a substantially constant cross-section perpendicular to axis 10.

Additionally, in some embodiments, base 120 may have a hole extending therethrough. The hole may extend substantially along axis 10. Accordingly, the hole may extend through, body 121, knob 122, neck 123, and/or surface 126. Further, the hole may be operable to allow for a wire or wire harness to pass therethrough.

First cup 130 may be disposed within first end 111 of tube 110 and centrally aligned with axis 10. Further, first cup 130 may have an end portion 131 and a wall portion 132 extending therefrom. End portion 131 may extend substantially perpendicular to axis 10. Additionally, first cup 130 may have a cross-sectional outer profile in a shape substantially similar to the cross-sectional shape of the inner boundary of tube 110 along the same plane perpendicular to axis 10. Thus, first cup 130 may substantially fit within and correspond to channel 113 at first end 111 of tube 110. Further, end portion 131 and wall portion 132 may conjointly define, at least in part, a cavity 133 of first cup 130. In some embodiments, at least part of wall portion 132 may be deflectable and/or deformable inward toward cavity 133 when an external force is applied thereto. In some such embodiments, wall portion 132 may accordingly comprise a plurality of fingers 134. Each finger 134 of the plurality may be configured and/or operable to deflect inward relative cavity 133. Additionally, knob 122 may be substantially disposed in cavity 133. Accordingly, second end 125 and/or surface 126 of knob 122 may abut end portion 131. Further, wall portion 132 may extend along middle portion 127 and/or first end 124. Additionally, wall portion 132 and/or fingers 134 may deflect along and apply a gripping force to the taper of first end 124. Accordingly, when in the defected positions, wall portion 132 and/or fingers 134 may substantially inhibit knob 122 from being removed from cavity 133. In some embodiments, the shape and interface of knob 122 and first cup 130 may inhibit or substantially prevent base 120 from pivoting relative first cup 130, via knob 122, such that knob 122 and/or neck 123 are taken out of central alignment with axis 10.

In some embodiments, first cup 130 may have an inner profile shape substantially similar to the shape of knob 122.

In such an embodiment, first cup 130 and knob 122 may fit closely together. In other embodiments, as shown in FIG. 2, first cup 130 may have an inner profile shape substantially different from the shape of knob 122, but still be operable to grip knob 122 and inhibit its removal from cavity 133. For example, knob 122 may have a circular cross-section and thus be a tapered cylinder, while first cup 130 may have a square cross-section and thus be a rectangular prism. In such an embodiment, first cup 130 may still accept knob 122 and deflect wall portion 132 and/or fingers 134 to apply force to the taper of first end 124 and inhibit knob 122 from being removed from cavity 133. In some such embodiments, the cross-sectional shape of tube 110 may substantially correspond to the cross-sectional shape of first cup 130. Thus, tube 110 and first cup 130 may have a polygonal cross-sectional shape in a plane perpendicular to axis 10 while knob 122 may have a circular or a different polygonal cross-sectional shape in the same plane.

Additionally, in some embodiments, first cup 130 may have a hole extending therethrough. The hole may extend substantially along axis 10. Accordingly, the hole may extend through, end portion 131. Further, the hole may be operable to allow for a wire or wire harness to pass therethrough.

Pivot 140 may have a ball portion 141 and a base portion 142. Ball portion 141 may, at least in part, have a substantially semi-spherical portion. Base portion 142 may be connected to the rearview assembly. Further, when in connection with the rearview assembly, pivot 140 may be such that the ball 141 is disposed substantially exterior relative a housing of the rearview assembly.

Additionally, in some embodiments, pivot 140 may have a hole extending therethrough. The hole may extend substantially along axis 10 when pivot 140 is positioned in substantial alignment with axis 10. Accordingly, the hole may extend through ball portion 141 and/or base portion 142. Further, the hole may be operable to allow for a wire or wire harness to pass therethrough.

Second cup 150 may be disposed within second end 112 of tube 110 and centrally aligned with axis 10. Further, second cup 150 may have an end portion 151 and a wall portion 152 extending therefrom. End portion 151 may extend substantially perpendicular to axis 10. Additionally, second cup 150 may have a cross-sectional outer profile in a shape substantially similar to the cross-sectional shape of the inner boundary of tube 110 along the same plane perpendicular to axis 10. Thus, first cup 130 may substantially fit and correspond to channel 113 at second end 112 of tube 110. Further, end portion 151 and wall portion 152 may conjointly define, at least in part, a cavity 153 of second cup 150. In some embodiments, at least part of wall portion 152 may be deflectable and/or deformable inward toward cavity 153 when an external force is applied thereto. In some such embodiments, wall portion 153 may accordingly comprise a plurality of fingers 154. Each finger 154 of the plurality may be operable to deflect inward relative cavity 153. Additionally, ball portion 141 may be substantially disposed in cavity 153. Further, wall portion 153 may extend from end portion 151 and along ball portion 141 beyond the widest part thereof. Additionally, wall portion 153 and/or fingers 154 may deflect along and apply a gripping force to a taper of ball portion 141 past the widest part thereof. Accordingly, when in the deflected positions, wall portion 153 and/or fingers 154 may substantially inhibit ball portion 141 from being removed from cavity 153. Additionally, the shape and interface of ball portion 141 and second cup 150 may allow for base portion 142 of pivot 140 to pivot relative second cup 150 such that base portion 142 may be articulated out of central alignment with axis 10.

In some embodiments, second cup 150 may have an inner profile shape substantially similar to the shape of ball portion 141. In such an embodiment, second cup 150 and ball portion 141 may fit closely together. In other embodiments, as shown in FIG. 2, second cup 150 may have an inner profile shape substantially different from the shape of ball portion 141, but still be configured and/or operable to grip ball portion 141 and inhibit its removal from cavity 153. For example, ball portion 141 may have a circular cross-section and thus be a tapered cylinder, while second cup 150 may have a square cross-section and thus be a rectangular prism. In such an embodiment, second cup 150 may still accept ball portion 141 and deflect wall portion 152 and/or fingers 154 to apply a force to the tape ball portion 141 beyond the widest point and inhibit ball portion 141 from being removed from cavity 143. In some such embodiments, the cross-sectional shape of tube 110 may substantially correspond to the cross-sectional shape of second cup 150. Thus, tube 110 and second cup 150 may have a polygonal cross-sectional shape in a plane perpendicular to axis 10 while ball portion 141 may have a circular or a different polygonal cross-sectional shape in the same plane.

In some embodiments, second cup 150 may have a hole extending therethrough. The hole may extend substantially along axis 10. Accordingly, the hole may extend through end portion 151. Further, the hole may be operable to allow for a wire or wire harness to pass therethrough.

Spring 160 may be centrally aligned with axis 10 and disposed within tube 110, between first cup 130 and second cup 150. In some embodiments, spring 160 may be a coil spring. Further, spring 160 may be at least partially compressed between first cup 130 and second cup 150. Accordingly, spring 160 may be operable to exert a force on end portion 131 of first cup 130 and on end portion 151 of second cup 150. The force exerted onto first cup 130 may be operable to jam wall portion 132 and/or fingers 134 into the taper of first end 111 of tube 110, causing wall portion 132 and/or fingers 134 of first cup 130 to compress and/or deflect and grip knob 122. Similarly, the force exerted onto second cup 150 may be operable to jam wall portion 152 and/or fingers 154 into the taper of second end 112 of tube 110, causing wall portion 152 and/or fingers 154 of second cup 150 to deflect and/or compress and grip ball portion 141.

Additionally, in some embodiments, spring 160 may have a hole extending therethrough. The hole may extend substantially along axis 10. Further, the hole may be operable to allow for a wire or wire harness to pass therethrough. In embodiments where base 120, first cup 130, pivot 140, second cup 150, and/or spring 160 have holes extending therethrough, mount assembly 100 may allow for the internal routing of a wire or wire harness therethrough from the rearview assembly.

Embodiments of mount assembly 100 may have one or more advantages. For example, in prior mounting assemblies, a cup was disposed within the rearview assembly housing along with a spring that wrapped around fingers of the cup to constrain and provide deflection for gripping. In mount assembly 100, second cup 150 and spring 160 may be disposed exterior the housing of the rearview assembly. Such a design takes up less space inside the rearview assembly, leaving increased room for hardware for technological features of the rearview assembly. Another advantage of some embodiments is that mount assembly 100 allows for pivoting at only second end 112 of tube 110 and not first end 111 of tube 110. Such an embodiment takes up less space proximate the windshield of the vehicle. In prior mounting assemblies, rotation was allowed proximate the windshield and/or base 120. In such a construction, more space proximate the base is needed to account for the pivoting of the mounting assembly. Thus, in these previous constructions, housings for cameras and sensors proximate the windshield had to avoid this area, causing significant spatial constraints given that the total area behind the rearview assembly suitable for the mounting of these cameras and sensors is relatively small. Embodiments of mount assembly 100, however, may allow for these housings to come very tight to base 120 of mount assembly 100, enabling a more compact design for a more pleasing aesthetic or providing increased space for additional cameras and/or sensors, enabling additional technological functionality of the vehicle.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A mount assembly comprising:
   a tube centrally aligned with an axis, the tube having a first end and a second end, the first and second ends each being tapered;
   a base configured for association with a vehicle, the base comprising (a) a body and (b) a knob extending from the body, the knob comprising (i) a first end proximal relative to the body that is tapered, (ii) a second end distal relative to the body that terminates in a flat surface facing away from the first end, and (iii) a middle portion between the first end and the second end;
   a first cup disposed within the first end of the tube, the first cup having an end portion, a wall portion extending from the end portion, a cavity defined, at least in part, by the end and wall portions, an inner profile shape shaped to mate with an external shape profile of the middle portion and the second end of the knob, wherein the end portion comprises an inner surface extending substantially perpendicular to the axis;
   a pivot comprising a ball portion, the pivot configured to associate with and support a rearview assembly;
   a second cup disposed within the second end of the tube, the second cups having an end portion, a wall portion, and a cavity defined, at least in part, by the end and wall portions; and
   a spring centrally aligned with the axis and disposed within the tube between the first and second cup, the spring configured to exert a force to the end portions of the first and second cups;
   wherein:
      the force exerted onto the first cup jams the wall portion of the first cup into the taper of the first end of the tube, causing (a) the wall portion of the first cup to deflect and grip the knob so that the knob is substantially disposed within the cavity of the first cup and (b) the inner profile shape and the inner surface of the end portion of the first cup to mate with the external shape profile of the middle portion and the second end of the knob so that (i) the knob extends from the body centrally aligned with the axis, (ii) the middle portion of the knob has a substantially constant cross-section perpendicular to the axis, and (iii) the flat surface of the second end of the knob lies in a plane perpendicular to the axis and abuts the inner surface of the end portion of the first cup; and
      the force exerted onto the second cup jams the wall portion of the second cup into the taper of the second end of the tube, causing the wall portion of the second cup to deflect and grip the ball portion so that the ball portion is disposed within the cavity of the second cup.

2. The mount assembly of claim 1, wherein an interface between the knob and the first cup is operable to prevent the base from pivoting off central alignment with the axis.

3. The mount assembly of claim 1, wherein the wall portion of the first cup comprises fingers.

4. The mount assembly of claim 1, wherein the pivot further comprises a base portion and the base portion is operable to pivot on the ball portion within the second cup such that the pivot may move out of central alignment with the axis.

5. The mount assembly of claim 1, wherein the end portion of the second cup comprises a surface extending substantially perpendicular to the axis.

6. The mount assembly of claim 1, wherein the spring is a coil spring.

7. The mount assembly of claim 1, wherein:
a cross-sectional profile of the tube in a plane perpendicular to the axis corresponds to a first polygon;
a cross-sectional profile of the first cup in the plane also corresponds to the first polygon; and
a cross-sectional profile of the knob in the plane corresponds to a circle.

8. The mount assembly of claim 1, wherein:
a cross-sectional profile of the tube in a plane perpendicular to the axis corresponds to a first polygon;
a cross-sectional profile of the second cup in the plane also corresponds to the first polygon; and
a cross-sectional profile of the ball portion in the plane corresponds to a circle.

9. The mount assembly of claim 1, wherein:
a cross-sectional profile of each of the tube, the first cup, and the knob, in a first plane perpendicular to the axis, corresponds to a circle; and
a cross-sectional profile of each of the tube, the second cup, and the ball portion, in a second plane perpendicular to the axis, corresponds to a circle.

10. The mount assembly of claim 1, wherein the pivot further comprises a base portion configured to connect to the rearview assembly such that the ball portion is disposed substantially exterior relative a housing of the rearview assembly.

11. The mount assembly of claim 1, wherein the wall portion of the second cup extends from the end portion and along the ball portion of the pivot beyond a widest part of the ball portion.

12. A mount assembly comprising:
a tube centrally aligned with an axis, the tube having a first end and a second end, the first and second ends each being tapered;
a base configured for association with a vehicle, the base having a knob centrally aligned with the axis;
a first cup disposed within the first end of the tube, the first cup having an end portion, a wall portion extending from the end portion, and a cavity defined, at least in part, by the end and wall portions, wherein the knob is substantially disposed, at least in part, within the cavity of the first cup;
a pivot comprising a ball portion, the pivot configured to associate with and support a rearview assembly;
a second cup disposed within the second end of the tube, the second cup having an end portion, a wall portion, and a cavity defined, at least in part, by the end and wall portions, wherein the ball portion is substantially disposed, at least in part, within the cavity of the second cup; and
a spring centrally aligned with the axis and disposed within the tube between the first and second cups, the spring configured to exert a force to the end portions of the first and second cups;
wherein:
the force exerted onto the first cup jams the wall portion of the first cup into the taper of the first end of the tube, causing the wall portion of the first cup to deflect and grip the knob;
the force exerted onto the second cup jams the wall portion of the second cup into the taper of the second end of the tube, causing the wall portion of the second cup to deflect and grip the ball portion;
the knob extends from a body of the base;
the knob has a first end proximal relative the body and a second end distal relative the body;
the first end of the knob is substantially tapered, at least in part; and
wherein an interface between the knob and the first cup is operable (i) to cause the first cup to grip the knob only with the knob in central alignment with the axis and (ii) to prevent the base from thereafter pivoting off central alignment with the axis.

13. The mount assembly of claim 12, wherein the second end of the knob terminates in a substantially flat surface substantially perpendicular to the axis.

14. The mount assembly of claim 12, wherein the wall portion of the first cup comprises fingers.

* * * * *

UNITED STATES PATENT AND TRADEMARK OFFICE
CERTIFICATE OF CORRECTION

PATENT NO. : 12,049,169 B2
APPLICATION NO. : 17/883897
DATED : July 30, 2024
INVENTOR(S) : Eric S. Sloterbeek It is certified that error appears in the above-identified patent and that said Letters Patent is hereby corrected as shown below:

In the Claims

Column 8, Claim 1, Line 29;
"cups" should be – cup –.

Column 8, Claim 1, Line 33;
"second cup" should be – second cups –.

Column 8, Claim 2, Line 58;
"an" should be – the –.

Column 10, Claim 12, Line 31;
"an" should be – the –.

Signed and Sealed this
Twenty-second Day of October, 2024

*Katherine Kelly Vidal*

Katherine Kelly Vidal
*Director of the United States Patent and Trademark Office*